United States Patent [19]

DiGiesi

[11] Patent Number: 4,860,142

[45] Date of Patent: Aug. 22, 1989

[54] COMPUTER DISK ADJUSTABLE WRITE PROTECT DEVICE

[76] Inventor: Anthony L. DiGiesi, R.D. 1, 6 Jenkins St., Stanhope, N.J. 07874

[21] Appl. No.: 87,220

[22] Filed: Aug. 20, 1987

[51] Int. Cl.$^4$ .................. G11B 23/03; G11B 15/04; G11B 19/04

[52] U.S. Cl. .................................. 360/133; 360/60

[58] Field of Search ..................... 360/133, 60, 132

[56] References Cited

U.S. PATENT DOCUMENTS

| | | | |
|---|---|---|---|
| 4,003,088 | 1/1977 | Schwartz | 360/60 |
| 4,053,935 | 10/1977 | Shiba | 360/60 |
| 4,460,930 | 7/1984 | Takahashi | 360/60 |
| 4,521,820 | 5/1985 | Fan | 360/133 |
| 4,536,812 | 8/1985 | Oishi et al. | 360/133 |
| 4,618,060 | 10/1986 | Tarter | 360/60 X |
| 4,660,105 | 4/1987 | Harris et al. | 360/60 |
| 4,771,354 | 9/1988 | Zschau | 360/133 |

FOREIGN PATENT DOCUMENTS 3603694 10/1986 Fed. Rep. of Germany ...... 360/133

*Primary Examiner*—John H. Wolff
*Assistant Examiner*—David J. Severin
*Attorney, Agent, or Firm*—Martha G. Pugh

[57] ABSTRACT

A flexible magnetic recording medium contained in a protective jacket is used for storing digital computer information. Such a device requires a write/erase inhibit function to preserve the previously stored information. This invention provides that function by the use of a continuously lockable shutter which can be inserted into the containment jacket. The jacket structure provides the shutter-locking channel by using an outside jacket edge and the side flap sealing embodiment to apply lateral pressure, thereby confining the enclosed shutter to slide along the jacket margin. Once so installed into the jacket, movement of this shutter is controlled through an access slot provided in the containment jacket, which slot is remote from the normal notch provided in the jacket, and is unemcumbered by any physical projection in the notch or jacket. This continuously locking shutter is adapted to accommodate an external object to facilitate shutter movement in one direction to block the jacket-contained write protect notch, and also in the opposite direction to unblock this notch. No other devices need be added to the shutter or jacket to facilitate the function.

4 Claims, 2 Drawing Sheets

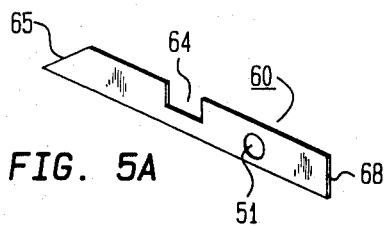
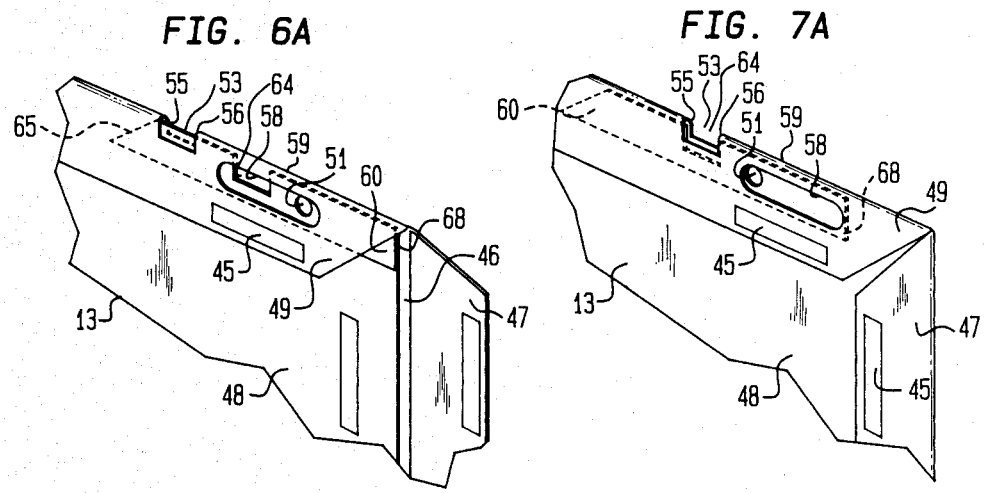
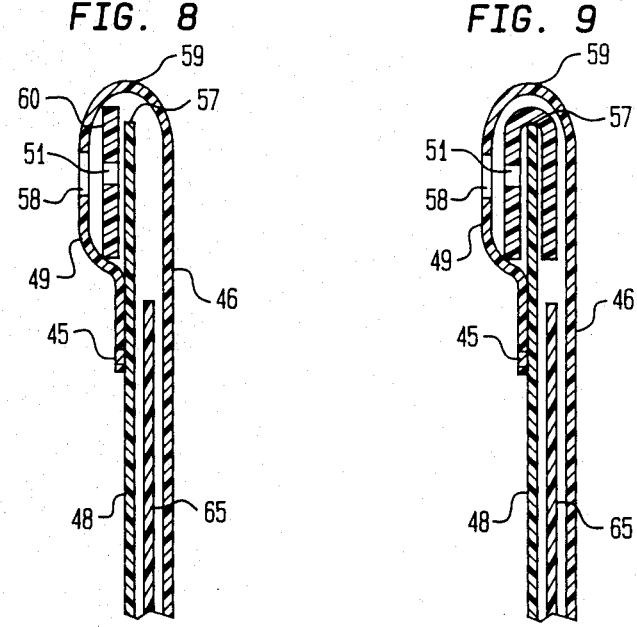

COMPUTER DISK ADJUSTABLE WRITE PROTECT DEVICE

BACKGROUND OF THE INVENTION

1. Field of the Invention

The invention relates generally to an enclosed write protect device for computer data storage media.

2. Description of Prior Art

Disk write protect devices prevent the unintentional erasure or overwriting of remanent data previously recorded. Heretofore a glue tab was used for that purpose. It is placed over a notch on the disk jacket to mediate the sensing of write enable by the computer. This tab is not convenient to use and once in place it is difficult to remove. Therefore, other methods have been devised, for example as were cited in Fann Patent # 4,521,820 and Tarter Patent # 4,618,060.

However each of these other methods also have disadvantages as well. One disadvantage common to these other methods is a protrusion beyond the plane of the media jacket. This will interfere with equipment used in the test, duplication and also the certification of the media. Another disadvantage to devices disclosed in prior art is that they contain a lip. Any lip so contained by a write protect device would make the installation of said device into the disk jacket very difficult, via the jacket notch or via the jacket top flap before as well as after this top flap is sealed. Since disk testing requires that as many as 100 disks be loaded into a hopper attached to automatic handling equipment, any lips and protrusion from the jacket can get snagged during this testing as well as during end user handling. An additional undesirable feature of this prior art device is that in one form there is contained a break away part or a perforated section which later must be removed for usage. Which would require additional handling and extra effort on the part of the potential user of this prior art device.

A fault of one other prior art device is that it was designed for the mechanical sensor with an arm therefore its design did not take account the optical methods which use light or infrared to pass thru the write protect notch to detect the blocked condition required to inhibit the erase and write function.

For a write protect device to be commercially acceptable it must be simple to use, positive in its setting, low cost and not interfere with the present equipment used for manufacture or testing of media. Said device also must not present additional problems for the individual user.

This new device solves all these problems, because it is recessed and enclosed within the jacket, and its activation mechanism is not exposed.

Another important feature of this invention is that the material used for fabrication is the same as the jacket material, which solves other problems inherant in prior art. It is readily available at very low cost and being opaque makes it ideal to block optical sensors. It is also rigid enough to block the mechanical arm sensor used in previous disk drive designs. Therefore one device can meet all demands required without additional modification or cost. No device up until now had all the features herein described

SUMMARY OF THE INVENTION

The objective of the present invention is to promulgate a built in write protect device that is convenient to use, easy to install, and very low cost to produce. Another object of the invention is to engender a write protect device that is fully enclosed within the disk cover jacket which precludes its contact with external objects such as the equipment used to copy, certify, and verify multiple disks. Since this equipment works unattended at high speed, any lips or parts which protrude and can snag are undesirable if the disks are to be stacked at any time during test or put into storage file containers. Undoubtedly no need exists in having a write protect device easily accessible since frequent adjustment is not required. Therefore the recessed device would be more prudent.

It has been observed that even the presently used glue tab gets caught on external objects because of it being located on the outside of the jacket. This is also very bothersome to the disk user. A further objective of this invention is to provide a device which can be simply locked into position. The salient features of this invention are as follows: it is an adjustable shutter device which is completely contained by the media jacket, it requires deliberate intervention by the user to change its position, and it contains no external adjustment means which can snag on external equipment during use. It is also more convenient to use than adhesive tab. Other advantages of this invention will be apparent in latter description. The present invention is precluded from inadvertent movement due to the cooperative relationship between this write protect device and its containment area. Because of lateral pressures exerted upon the device by the jacket edge fold and the sealing embossment of the notch flap, as well as by the forces applied by the shutter device's containment within the notch flap, and finally due to the light weight nature of this shutter device, the force required to move it can not be exceeded during normal use or accidental dropping of the jacket on any edge. An alternate method to lock the shutter can be a slight recess or raised area in the device that will engage a similar area in the jacket.

Since the top flap of the disk jacket is the last to be sealed, any write protect shutter device should be inserted orthogonally from this edge. Ideally the shutter shape should allow insertion from this top edge after it is sealed at the diagonal space left between said top flap and the side notch flap, into the channel it forms with the main bottom surface of the jacket.

The method employed in changing position of this write protect shutter device is thru an aperture in the disk media jacket, which exposes a means in the shutter device that facilitates movement of this shutter mechanism. Said movement of the shutter device being infrequent it is therefore, not required to be readily accessable but instead requires deliberate action by the user to change its position when desired, in order to effect the write/erase protect function. When the applied force used to move said shutter desists, the shutter automatically locks in position.

The preferred embodiment of this new invention is the flat shutter, or a slightly elongated flat shutter which contains a squarer shaped notch along its length, because this flat shutter shape would be the easiest to fabricate and use. A tertiary preferred embodiment is a folded-in-length shutter, because its design permits insertion only during time of manufacture of the disk, into the top disk jacket edge before its flap sealed. Therefore, it is suited for only a few of the many sealing methods used by various disk manufactures.

This being the last disk manufacturing operation of presently used equipment in the industry, each of these described shutters may contain a pointed front to allow ease of movement traversing the write protect notch edge.

BRIEF DESCRIPTION OF THE DRAWINGS

Referring to FIG. 5A, a plain view of another preferred embodiment of the flat shutter. In this case, the shutter is now elongated and contains a notch along its length. FIG. 6A is a perspective view of the shutter depicted in FIG. 5A installed in the closed position to prevent erasure or write to the disk. In this position the disk can only be read by the computer system. In this partial view the disk jacket top is open. The shutter contained notch and the shutter adjustment means is visable. The jacket channel in which it resides is observed, and the side flap sealing embossment is discernable. In FIG. 7A the shutter in FIG. 5A is depicted in its open position to allow erasure and write to disk.

FIG. 8 is a top edge view of the shutter device of FIG. 5 or alternatively the shutter in FIG. 5A installed in the side flap jacket channel. Each of these device can be installed between the notch flap fold area and main bottom surface of the media jacket. This is a cross sectional view of the area described.

FIG. 9 is a cross sectional view of the jacket top edge showing the notch flap area of the media jacket and the folded write protect shutter of FIG. 2 installed.

DESCRIPTION OF THE PREFERRED EMBODIMENT

Figure 1:
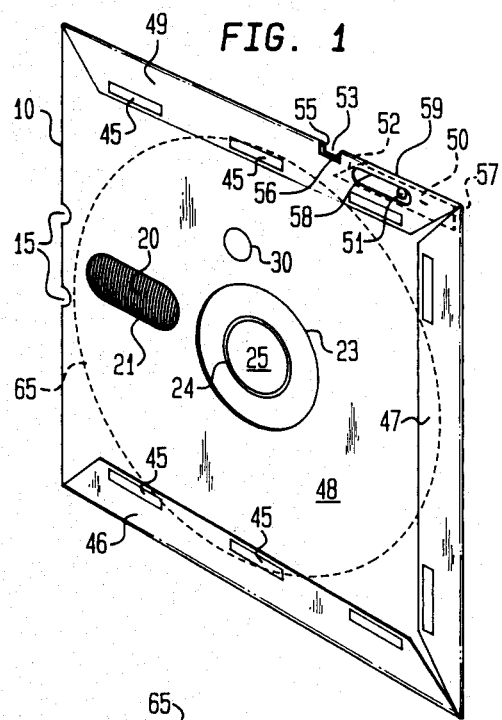
FIG. 1 is an isometric view showing the full disk media jacket from the bottom and indicating the location of the notch flap access area of the shutter write protect device.
Figure 2:
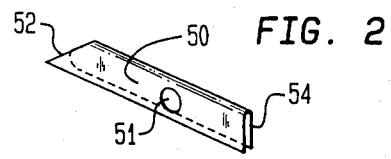
FIG. 2 is a plain view of the shutter device in one of its preferred embodiment depicting a folded in length shutter device with an access area for adjustment. Its unequal side lengths are indicated as well.

Referring to FIGS. 1, 2, 3 and 4, an embodiment of the invention is shown in which the full view of disk media 10 and partial view of the area involved in the write protect function 12 is depicted. The folded write protect type shutter of FIG. 2 is installed in place between the notch flap 49 and the main bottom jacket flap 48 to contain the write protect shutter mechanism 50. The duplicate part of the folded shutter lies between the main bottom jack flap 48 and the main top jacket flap 46. This is the device short side. The aperture area 58 is shown and adjustment means 51 of this shutter is also depicted. The shutter device can travel longitudinally and parallel to the jacket edge 59 in the notch area of the jacket. It covers the notch of aperture opening 53 when moved to position 55 and can also move in the opposite direction to uncover the notch opening 53 when front edge 52 is next moved longitudinally to position 56. The folded shutter 50 during this movement slides upon the edge 57 of the main bottom jacket flap 48.

Figure 3:
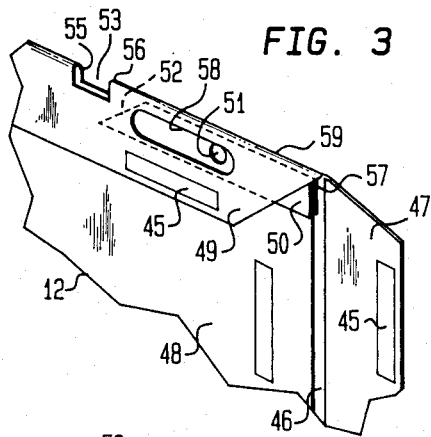
FIG. 3 is a perspective view of the folded shutter in FIG. 2 installed in the open and write, erase allow position in the media jacket. This is a partial view of the write protect notch area of the jacket flap with the top flap open. The shutter adjustment means and the jacket aperture are also shown in this view.
Figure 4:
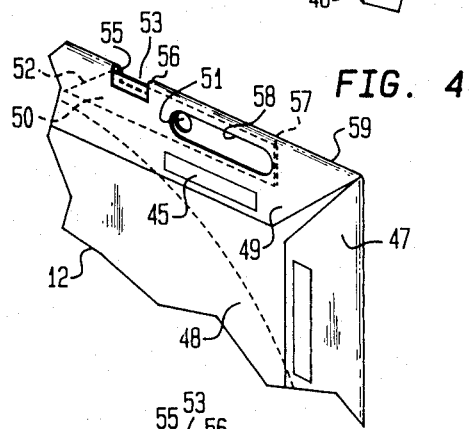
FIG. 4 is a perspective view of the folded shutter of FIG. 2 in its closed position to prevent write or erasure of the previously recorded data. The top flap is now closed.
Figure 5:
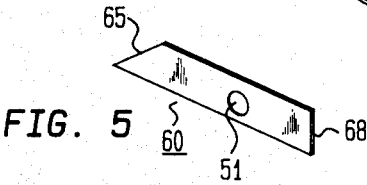
FIG. 5 is a plain view of another preferred embodiment depicting a generally flat type write protect shutter device. It contains a shaped front edge and an adjustment means to impart longitudinal movement of this shutter along the notch edge of the jacket.
Figure 6:
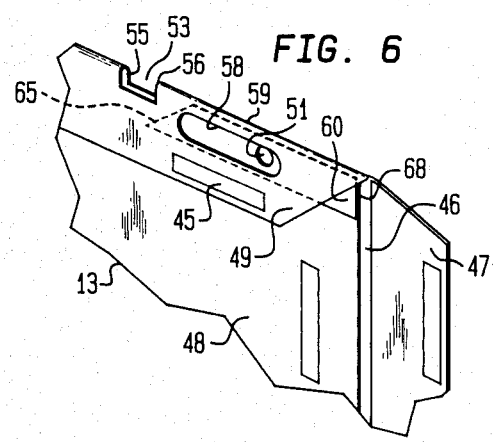
FIG. 6 is a perspective view of the device in FIG. 5 installed in the jacket notch open position to allow erasure and write to the disk media.
Figure 7:
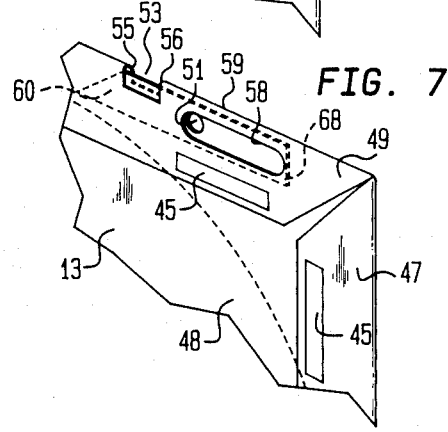
FIG. 7 is a perspective view of the shutter device of FIG. 5 installed in the closed position over the write protect notch to prevent erasure or write to the disk media. This is the disk read only position.

In this preferred embodiment the shutter device is effectively trapped from any free movement by lateral force exerted upon it by the sealing embossment 45 and the opposite jacket edge 59. The shutter device 50 is moved to open or cover the write protect notch or aperture 53 using shutter means 51. Therefore, no part of the shutter need be exposed outside the plane of the disk media jacket. Referring to FIGS. 5, 6 and 7, this preferred embodiment shows a generally flat type shutter device 60 which contains a shaped front 65 and an access area 51. When this shutter is inserted between the notch flap 49 and the main bottom jacket surface 48 its front 65 can now be moved longitudinally along the side edge 59 of the media jacket into the notch covered position 55 and also be moved into the notch open position 56. The shaped front 65 of this shutter is used to guide the shutter past position 55. Also the shutter device is restricted from free movement by the lateral forces exerted upon it by the jacket sealing area 45 and jacket edge fold 59. The cooperative relationship between the jacket flap 49 and the surface of bottom flap 48 provide a channel in which this shutter device can slide longitudinally and parallel to edge 59. The aperture in the notch edge fold 58 allows access to the shutter device movement means 51. A common ball point pen can then be used as the activating tool to provide the required shutter movement of 65 between position 55 and 56, and to overcome the frictional force and the lateral pressure on the shutter device 60 due to the flap seal 45 and the jacket edge fold 59 and also the frictional force due to the main bottom jacket 48 and the notch flap 49, sufficient force must be applied to 51 shutter device movement means to move the shutter in its channel longitudinally and bidirectionally. Referring now to FIG. 5A, a variation of the shutter depicted in FIG. 5 is shown. In this design a slightly elongated shutter 60 with a notch 64 is observed. This longer device has a much smoother operation in use. In FIG. 6A the shutter of FIG. 5A is shown in the closed position which is the disk write protect position. In FIG. 7A the elongated shutter of FIG. 5A is shown in its open position with notch 64 in alignment with jacket notch 53. It should be observed that shutter movement required of FIG. 5A is opposite to that of shutter in FIG. 5 to cover and uncover the jacket notch 53. It should be noted that shutter of FIG. 5 opens the jacket notch when shutter device movement means 51 is moved away from position 55 and the shutter of FIG. 5A opens the jacket notch when 51 is moved toward position 55 due to the alignment of notch 64 with notch 53, as depicted in FIG. 6 and FIG. 7A, respectively. Referring to FIG. 8, a cross sectional view of the disk jacket top edge shows the shutter device 60 being contained inside the notch side channel which is formed by the edge fold 59 and the notch flap 49 and surface 48 to effectively contain this generally flat shutter device. Referring to FIG. 9, a cross sectional view of the disk jacket top edge is shown with the lengthwise folded shutter device 50 installed in the channel formed by the notch flap 49 and the bottom jacket flap 48. The folded shutter device wraps around the bottom flap edge 57 and slides along this edge when 50 moved between the notch open position 56 and notch closed position 55. The heat seal embossment 45 and the jacket edge 59 pinches and exerts lateral pressure on the shutter device to lock it in this channel as was previously described. The opposite fold of 50 resides between surface 48 and jacket flap 46 and is shaped to avoid contact with 65 the ferrous coated disk media itself. Referring to FIG. 3, FIG. 6 and FIG. 6A the top jacket flap fold 47 is shown in its open position before the final fold and seal operation of this top flap is completed by equipment used for this purpose. In this open position, the magnetic media 65 and shutter device 50 must be installed. Shutter 60 of FIG. 5 and FIG. 5A can be installed before as as well as after the top jacket flap 47 is closed and sealed. It is inserted into the corner gap between flaps 49 and 47 shown in the FIG. 5 and FIG. 5A into the notch flap enclosed area until the shutter adjustment means is visable in the jacket aperture.

While the above descriptions contain many embodiments, these should not be construed as limitations on the scope of the invention, but rather an exemplification of the preferred embodiment thereof. Many other variations are possible, for example:

(a) different shutter material
(b) other shutter shapes.
(c) other shutter movement means.
(d) other physical location of parts.
(e) different aperture shapes and location.
(f) other shutter locking schemes.

Accordingly the scope of the invention should be determined not by the embodiments illustrated but by the claims and their legal equivalents.

I claim:

1. A magnetic disk jacket formed of substantially plane semi-rigid material, said disk jacket constructed to enclose a disk, said jacket having a "write/erase protect device";

said jacket having a flap folded inwardly along one edge to form a partially closed channel in said folded portion;

an elongated shutter slideably mounted in covered relationship in said channel in frictional contact with the upper and lower inner surfaces of said channel;

a "write protect" opening formed in the side of said jacket of said disk, said write protect opening being so disposed in said jacket flap to enable said shutter to move slideably in frictional contact in said channel a longitudinal or lateral direction to a blocking position to block said write protect opening, and alternatively to a write allow position to unblock said write protect opening;

an elongated control opening in said jacket flap spaced apart from said write protect opening, for exposing said shutter in said channel;

said control opening constructed to accommodate a pointed instrument for contacting and engaging said shutter through said control opening at a point below the surface of said jacket to move said shutter against frictional bias from said write allow position to said blocking position and vice versa, said frictional bias being constrained to lock said shutter into said alternative positions.

2. The combination in accordance with claim 1 wherein said shutter is locked into said blocking position or said write allow position in said channel by the bias imposed by the frictional contact between the surfaces of said shutter and the inner surfaces of said channel, which frictional bias is sufficient to hold said shutter locked in place.

3. The combination in accordance with claim 1 wherein said shutter is an elongated member formed of substantially plane, opaque, rigid material, confined in said partially enclosed channel, and devoid of lateral projections which extend beyond the edge of said jacket.

4. The combination in accordance with claim 1 wherein said shutter is an elongated member without lateral projections of a rigid material which is responsive to trigger the operation of mechanical, optical or infrared notch sensors.

* * * * *